United States Patent
Taguma et al.

(10) Patent No.: US 9,902,313 B2
(45) Date of Patent: Feb. 27, 2018

(54) TWO-WHEELED MOTOR VEHICLE

(71) Applicant: HONDA MOTOR CO., LTD., Tokyo (JP)

(72) Inventors: Takahiro Taguma, Wako (JP); Kazunori Yoshimura, Wako (JP); Takumi Gato, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 3 days.

(21) Appl. No.: 15/024,657

(22) PCT Filed: Sep. 27, 2013

(86) PCT No.: PCT/JP2013/076338
§ 371 (c)(1),
(2) Date: Mar. 24, 2016

(87) PCT Pub. No.: WO2015/045115
PCT Pub. Date: Apr. 2, 2015

(65) Prior Publication Data
US 2016/0214671 A1  Jul. 28, 2016

(51) Int. Cl.
*B60Q 1/26* (2006.01)
*B60Q 1/00* (2006.01)
(Continued)

(52) U.S. Cl.
CPC ......... *B60Q 1/2661* (2013.01); *B60Q 1/0005* (2013.01); *B62J 1/08* (2013.01);
(Continued)

(58) Field of Classification Search
CPC ......... B62J 1/08; B62J 6/00; B62J 6/04; B62J 15/00; B62J 17/00; B62K 11/00;
(Continued)

(56) References Cited

U.S. PATENT DOCUMENTS 2,824,753 A * 2/1958 La Voie ................. B60K 15/04
280/853
3,927,727 A * 12/1975 Hanagan ................... B62J 1/12
180/219
(Continued)

FOREIGN PATENT DOCUMENTS

CA  2924947 A1 * 4/2015 ................ B62J 6/04
JP  S57-9185  2/1982
(Continued)

OTHER PUBLICATIONS

International Search Report, dated Dec. 24, 2013 (Dec. 24, 2013).
(Continued)

*Primary Examiner* — Joseph M Rocca
*Assistant Examiner* — Maurice L Williams
(74) *Attorney, Agent, or Firm* — Rankin, Hill & Clark LLP

(57) ABSTRACT

A two-wheeled motor vehicle is configured in such a manner that left and right side body covers (35L, 35R) are mounted to left and right seat rails (14L, 14R), respectively, so as to cover the sides of the vehicle body (20) and so as to sandwich a tail light unit (62). A rear center lower cover (50) has a cover center mounting section (51), a cover left mounting section (52L), and a cover right mounting section (52R). The cover center mounting section (51) is mounted to a second cross plate (27) together with a light center mounting section (65) and a center mounting section (46). The cover left mounting section (52L) and the cover right mounting section (52R) are individually mounted to a rear fender (40) so as to cover a part of the rear fender (40) from below.

3 Claims, 13 Drawing Sheets

(51) Int. Cl.
  *B62J 6/04* (2006.01)
  *B62J 15/00* (2006.01)
  *B62J 17/00* (2006.01)
  *B62J 1/08* (2006.01)
  *B62K 11/02* (2006.01)

(52) U.S. Cl.
  CPC ............... *B62J 6/04* (2013.01); *B62J 15/00* (2013.01); *B62J 17/00* (2013.01); *B62K 11/02* (2013.01); *B62K 2202/00* (2013.01)

(58) Field of Classification Search
  CPC ...... B62K 11/02; B62K 11/04; B60Q 1/0005; B60Q 1/26; B60Q 1/2661; B60Q 1/30
  See application file for complete search history.

(56) References Cited

U.S. PATENT DOCUMENTS

| | | | | |
|---|---|---|---|---|
| 3,941,994 | A * | 3/1976 | Petty | B62J 6/04 362/473 |
| 4,500,101 | A * | 2/1985 | Aoki | B62J 17/00 180/219 |
| 2002/0007977 | A1* | 1/2002 | Ishii | B62J 17/00 180/219 |
| 2006/0077677 | A1* | 4/2006 | Yamaguchi | B60Q 1/0094 362/473 |
| 2007/0025113 | A1* | 2/2007 | Isayama | B60Q 1/44 362/473 |
| 2007/0177387 | A1* | 8/2007 | Wakamatsu | B62J 6/04 362/341 |
| 2007/0216132 | A1* | 9/2007 | Ozawa | B62J 1/28 280/304.5 |
| 2007/0230202 | A1* | 10/2007 | Ohzono | B62J 6/04 362/516 |
| 2008/0158895 | A1* | 7/2008 | Onoda | B62J 6/04 362/473 |
| 2008/0205073 | A1* | 8/2008 | Suita | B60Q 1/2607 362/473 |
| 2009/0079156 | A1* | 3/2009 | Ichihara | B62J 15/00 280/152.1 |
| 2009/0108557 | A1* | 4/2009 | Kobayashi | B62J 15/04 280/152.1 |
| 2009/0114466 | A1* | 5/2009 | Nishijima | B62J 15/00 180/219 |
| 2010/0194149 | A1* | 8/2010 | Yamamoto | B62J 15/00 296/198 |
| 2010/0243358 | A1* | 9/2010 | Suzuki | B62J 35/00 180/219 |
| 2010/0244493 | A1* | 9/2010 | Iida | B62J 6/04 296/193.08 |
| 2011/0051441 | A1* | 3/2011 | Nishijima | B60Q 1/56 362/473 |
| 2011/0063862 | A1* | 3/2011 | Hotei | B60Q 1/2607 362/473 |
| 2011/0074183 | A1* | 3/2011 | Kanezuka | B62J 17/00 296/193.08 |
| 2011/0241422 | A1* | 10/2011 | Suzuki | B60Q 1/56 307/10.8 |
| 2012/0188777 | A1* | 7/2012 | Hamauzu | B62J 15/00 362/473 |
| 2012/0320612 | A1* | 12/2012 | Yamakura | B62J 6/005 362/473 |
| 2013/0258690 | A1* | 10/2013 | Oguchi | B62J 6/04 362/473 |
| 2013/0313861 | A1* | 11/2013 | Koyama | B62J 15/00 296/198 |
| 2013/0320691 | A1* | 12/2013 | Oshita | B60N 3/00 296/37.1 |
| 2014/0063825 | A1* | 3/2014 | Nakamura | B62D 25/16 362/473 |
| 2014/0090912 | A1* | 4/2014 | Kontani | B62J 17/02 180/68.3 |
| 2014/0291958 | A1* | 10/2014 | Tanaka | B62K 11/00 280/202 |

FOREIGN PATENT DOCUMENTS

| | | |
|---|---|---|
| JP | 2009-113557 | 5/2009 |
| JP | 2010-274850 | 12/2010 |
| JP | 2011156886 A * | 8/2011 |
| JP | 2012-046142 | 3/2012 |

OTHER PUBLICATIONS

International Report on Patentability and Written Opinion of the International Searching Authority with English Translation dated Dec. 24, 2013, 10 pages.
European Search Report dated Jun. 27, 2017, 7 pages.

* cited by examiner

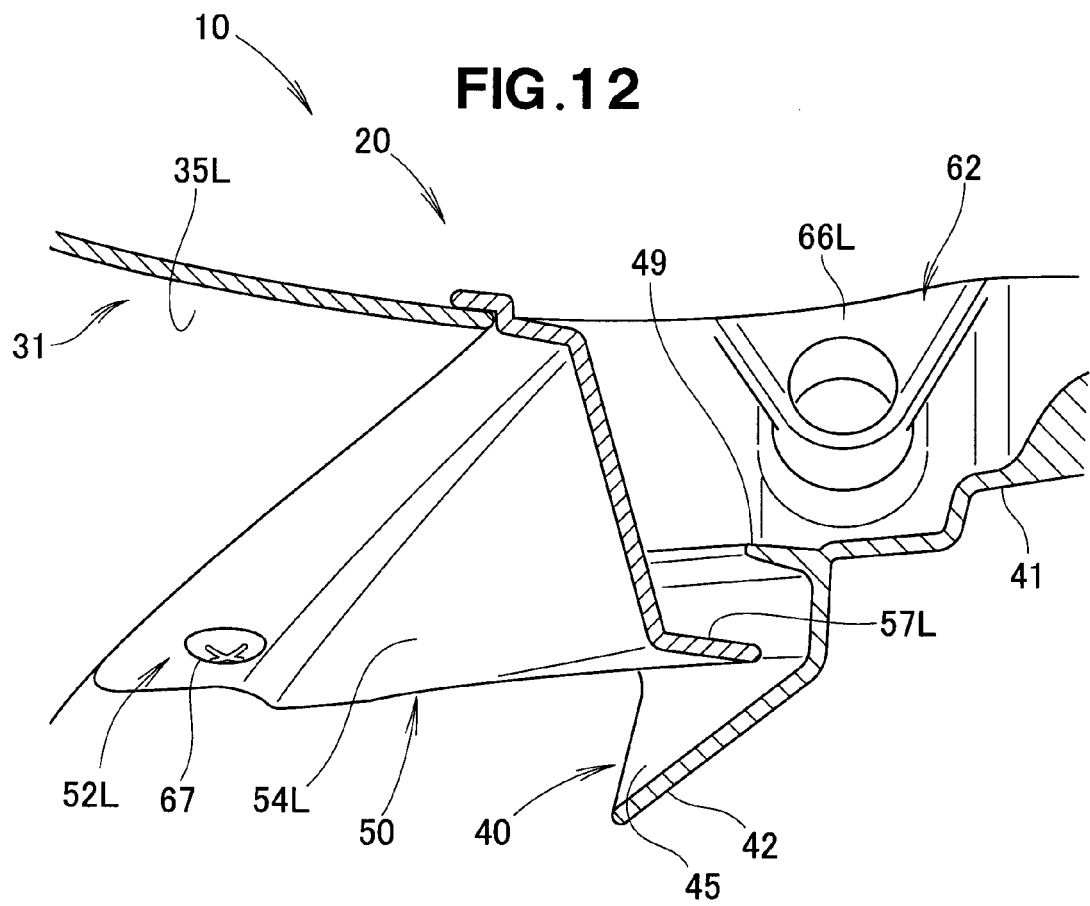
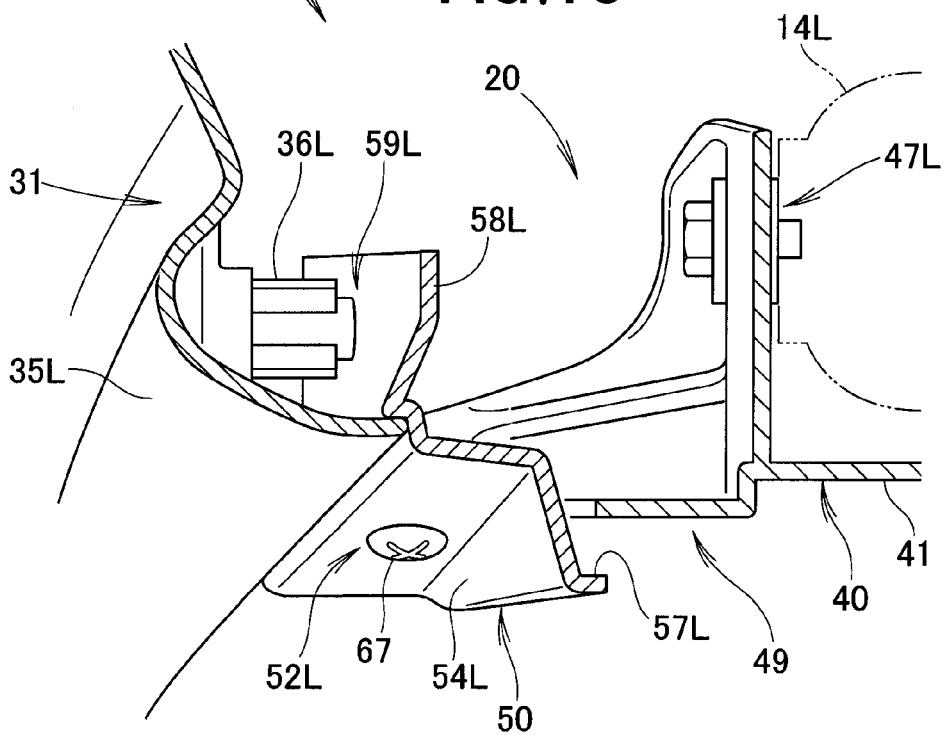

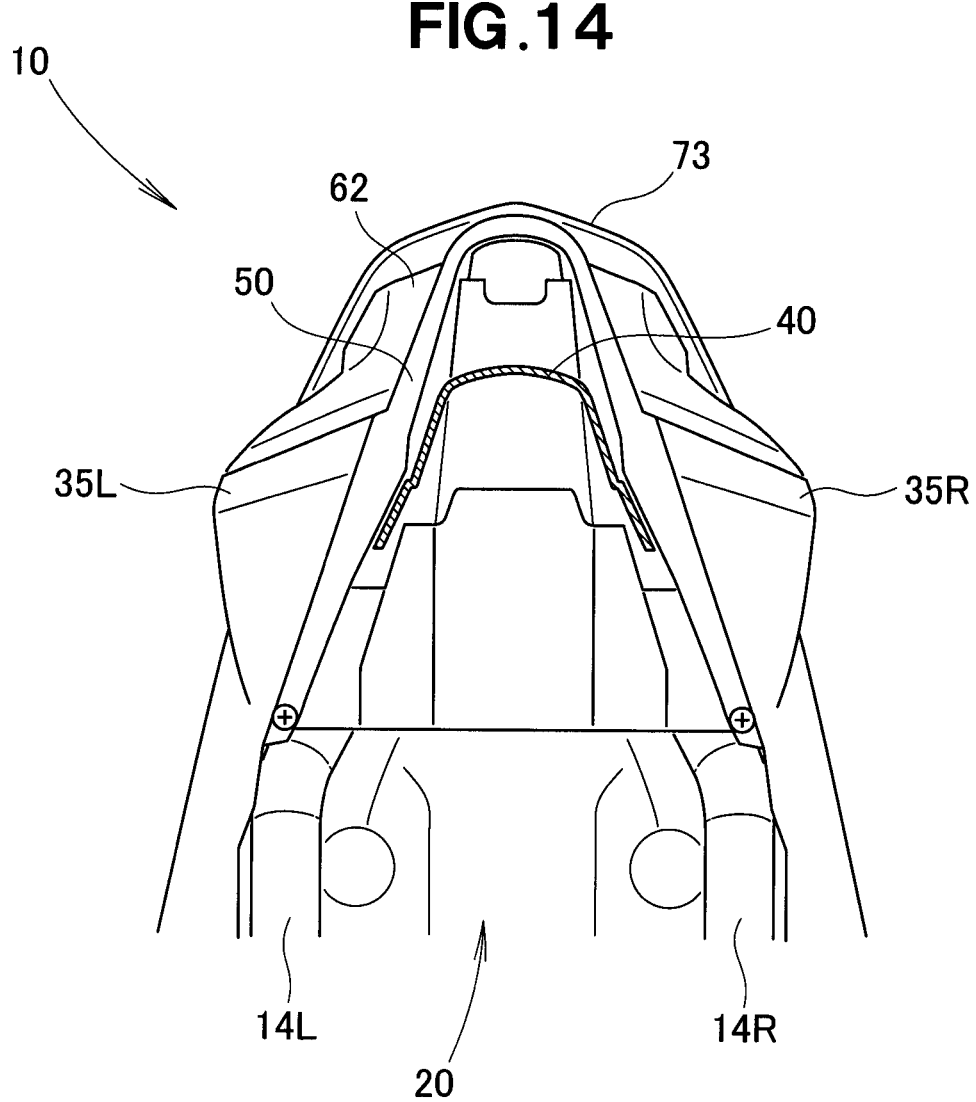

TWO-WHEELED MOTOR VEHICLE

TECHNICAL FIELD

The present invention relates to an improvement to a motorcycle including a rear fender covered with left and right side body covers.

BACKGROUND ART

A motorcycle, which is disclosed in patent literature 1 below, includes left and right side body covers that cover lateral sides of a rear part of the motorcycle, and a rear fender having an upper part covered with these body covers.

The disclosed motorcycle further includes left and right seat rails extending to the rear part of the motorcycle. These seat rails are covered with the left and right side body covers. The rear fender is disposed on rear portions of the seat rails. The left and right side body covers, which rise from left and right lateral ends of an upper portion of the rear fender, cover the rear fender. The upper portion of the rear fender, which has the lateral ends contiguous with the side body covers, is wide enough to prevent splash of muddy water as the muddy water is forced upwardly by the rear wheel.

The size of the rear fender, which unfortunately depends upon a width between the left and right seat rails supporting the side body covers, is too large relative to the width of the rear wheel. The way to address this problem is to provide a technique enabling the rear fender to have a small size regardless of the width between the left and right seat rails.

PRIOR ART LITERATURE

Patent Literature

Patent Literature 1: JP-A-2012-46142

SUMMARY OF INVENTION

Technical Problem

It is an object of the present invention to provide a technique enabling a rear fender to have a small size regardless of a width between left and right seat rails.

Solution to Problem

According to the invention defined in claim 1, there is provided a motorcycle comprising: seat rails disposed above a rear wheel and supporting a seat: a taillight unit disposed on the seat rails for emitting light rearward; left and right side body covers disposed on the seat rails and covering lateral sides of a body of the motorcycle, the left and right side body covers covering the taillight with the taillight unit held between the left and right side body covers; a rear fender disposed on rear parts of the seat rails for preventing splash of muddy water as the muddy water is forced upwardly by the rear wheel; and a rear center lower cover covering a lower side of the taillight unit, wherein the rear fender has at least one portion provided inside the respective seat rails in a widthwise direction of the motorcycle, and the rear center lower cover is interposed between the rear fender and the left and right side body covers in the widthwise direction of the motorcycle.

According to the invention defined in claim 2, the rear fender comprises a horizontal portion and a rear hung portion. The rear hung portion has a width extending in the widthwise direction, and the rear center lower cover has a width extending in the widthwise direction, the width of the rear hung portion is smaller than the width of the rear center lower cover.

According to the invention defined in claim 3, the rear center lower cover covers at least one part of the rear fender from below.

According to the invention defined in claim 4, the rear center lower cover includes left and right bends provided at a bottom of the rear center lower cover, the left and right bends protruding inwardly in the widthwise direction, and wherein the left and right bends protrude inwardly in the widthwise direction beyond opposite ends of the rear hung portion.

According to the invention defined in claim 5, the horizontal portion includes a projection protruding outwardly toward the rear center lower cover in the widthwise direction. The projection, each of the bends, and the rear hung portion define a labyrinth structure.

According to the invention defined in claim 6, the motorcycle further comprises: a plate member disposed on a rear surface of the rear fender and identifying the motorcycle; a fastener attaching the plate member to the rear surface of the rear fender; and a lamp disposed on an upper part of the rear fender for illuminating the plate member. The rear center lower cover covers the lamp from above.

Advantageous Effects of Invention

As to the invention defined in claim 1, the rear fender has at least the one portion provided inside the respective seat rails in the widthwise direction of the motorcycle, and the rear center lower cover is interposed between the rear fender and the left and right side body covers in the widthwise direction of the motorcycle. The rear fender has its width smaller than a width between the left and right seat rails, and the rear center lower cover covers a region between the left and right side body covers. This allows the refer fender to have a small size without the need to alter the width between the left and right seat rails.

As to the invention defined in claim 2, the rear fender comprises the horizontal portion and the rear hung portion. The rear hung portion is small-sized due to its width smaller than the width of the rear center lower cover. This allows the rear fender to have a smaller size.

As to the invention defined in claim 3, the rear center lower cover covers at least the one part of the rear fender from below, and thus is contiguous with the rear fender. The contiguity between the rear fender and rear center lower cover and the respective left and right side body covers not only allows the rear fender to have the width without depending upon the width between the left and right seat rails, but also prevents splash of muddy water as the muddy water is forced upward by the rear wheel. This enables the rear fender to have the small size without the need to alter the width between the left and right seat rails.

As to the invention defined in claim 4, the rear center lower cover includes the left and right bends provided at the bottom of the rear center lower cover, the left and right bends protruding inwardly in the widthwise direction. The rear center lower cover, which includes the left and right bends protruding inwardly in the widthwise direction beyond the opposite ends of the rear hung portion, overlaps the rear fender and thus prevents muddy water from intruding into the rear center lower cover as the rear wheel forces the muddy water upward. This also prevents the muddy water from reaching the taillight unit disposed above the rear center lower cover.

As to the invention defined in claim 5, the horizontal portion includes the projection protruding outwardly toward the rear center lower cover in the widthwise direction. The projection, each of the bends, and the rear hung portion define a labyrinth structure. This labyrinth structure prevents the muddy water from intruding into the rear center lower cover. The labyrinth structure protects the taillight unit from the muddy water.

As to the invention defined in claim 6, the lamp is disposed on the upper part of the rear fender for illuminating the plate member. Removal of the rear center lower cover, which covers the lamp, allows for a maintenance operation on the lamp. Thus, the well-maintained lamp is provided.

BRIEF DESCRIPTION OF DRAWINGS

FIG. 12 is a cross-sectional view taken along line 12-12 of FIG. 11;

FIG. 13 is a cross-sectional view taken along line 13-13 of FIG. 11; and

FIG. 14 is a cross-sectional view taken along line 14-14 of FIG. 2.

DESCRIPTION OF EMBODIMENT

The preferred embodiment is discussed below with reference to the accompanying drawings.

Embodiment

Figure 1:
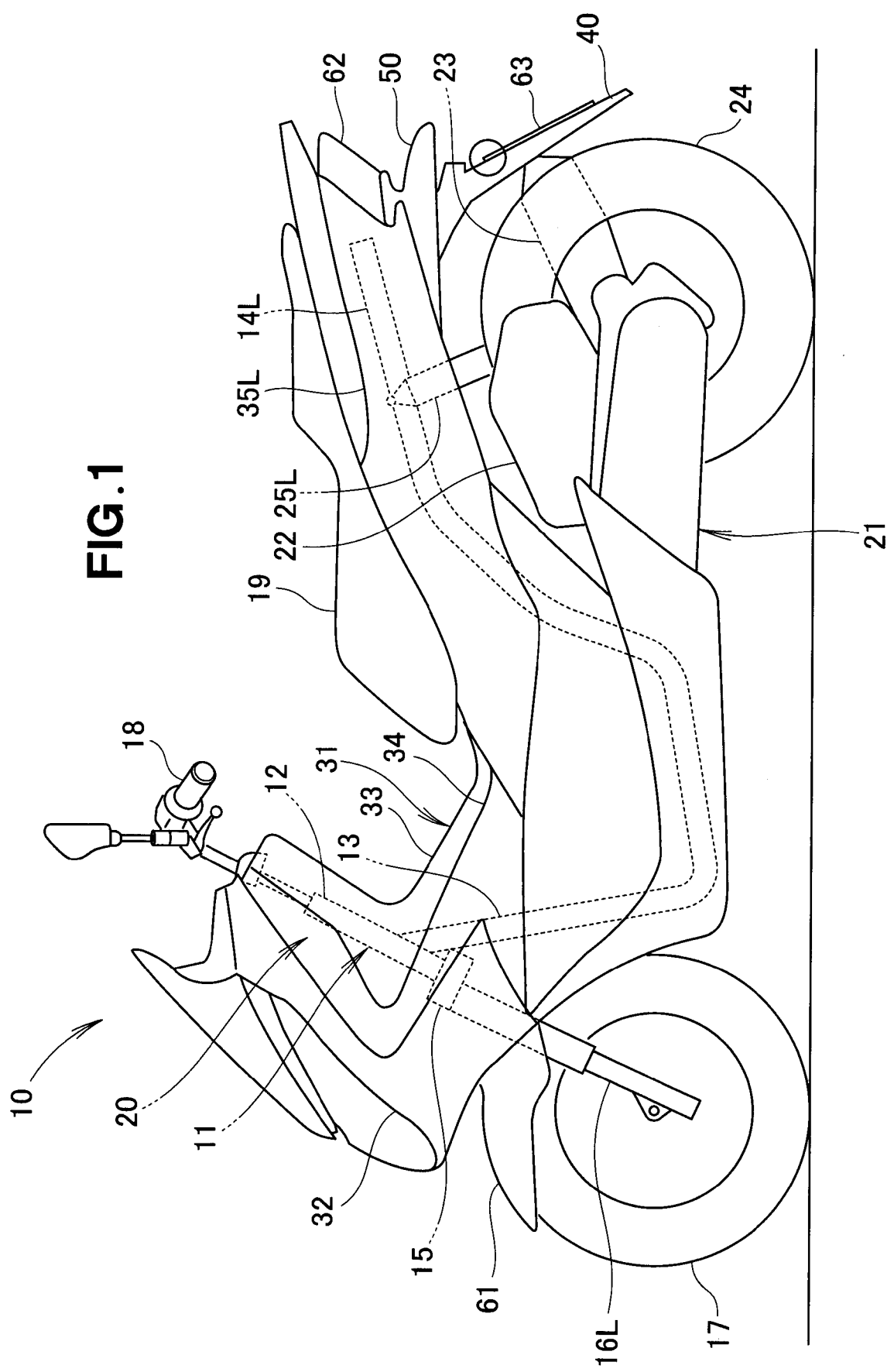
FIG. 1 is a left side elevation view of a motorcycle using a rear center lower cover according to the present invention.

As shown in FIG. 1, a motorcycle 10 includes a motorcycle frame 11, a power unit 21 pivotably suspended on a rear part of the frame 11, and a motorcycle cover 31 covering the frame 11

The frame 11 includes a head pipe 12, a main frame 13 extending rearward and downward from the head pipe 12, and seat rails 14 extending rearward and upward from a rear end of the main frame 13. The frame 11 defines a motorcycle body 20.

The head pipe 12 has a bottom supporting a front fork 16L through a bottom bridge 15. The reference characters "L" and "R" as used herein are suffixes indicating the left and the right, respectively. A front wheel 17 is rotatably supported by the front fork 16L. A handle 18 for steering the front wheel 17 is disposed on a top of the head pipe 12. A rider's seat 19 is disposed above the left and right seat rails 14L.

The power unit 21 includes an intake cleaner 22, an exhaust muffler 23, and a rear wheel 24 as a drive wheel. Left and right rear cushions 25L are disposed between the power unit 21 and the pair of the seat rails 14L for absorbing impact.

The motorcycle cover 31 includes a front cover 32 covering a front side of the head pipe 12, a main frame cover 33 covering an upper side of the main frame 13, a front side cover 34 covering opposite lateral sides of the main frame 13, left and right side body covers 35L covering the left and right set rails 14L, and a rear center lower cover 50 interposed between a rear fender 40 and each of the left and right side body covers 35L. A front fender 61 covers an upper side of the front wheel 17, and the rear fender 40 covers an upper side of the rear wheel 24.

Figure 2:
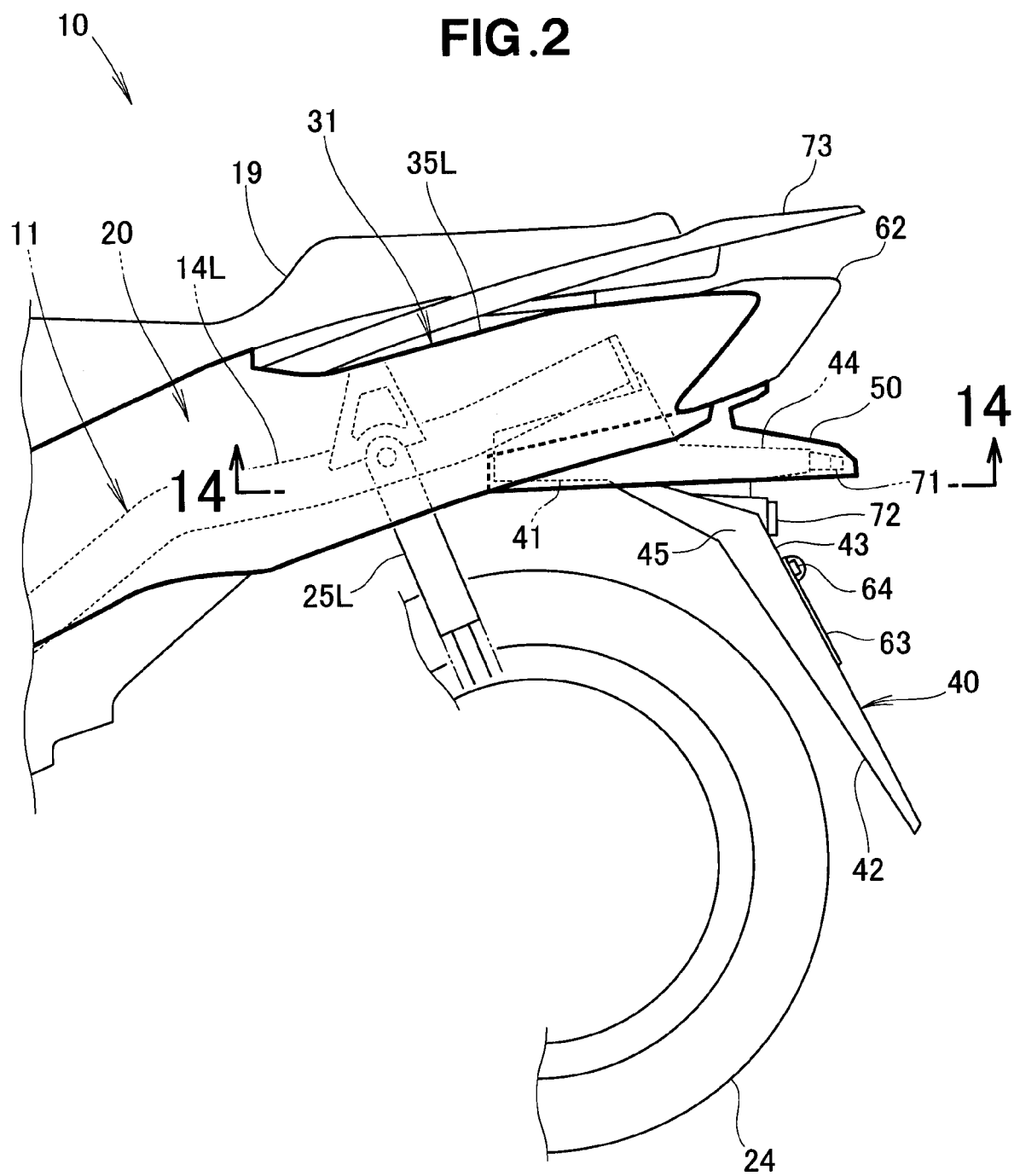
FIG. 2 is an enlarged view of a rear part of the motorcycle shown in FIG. 1.
Figure 3:
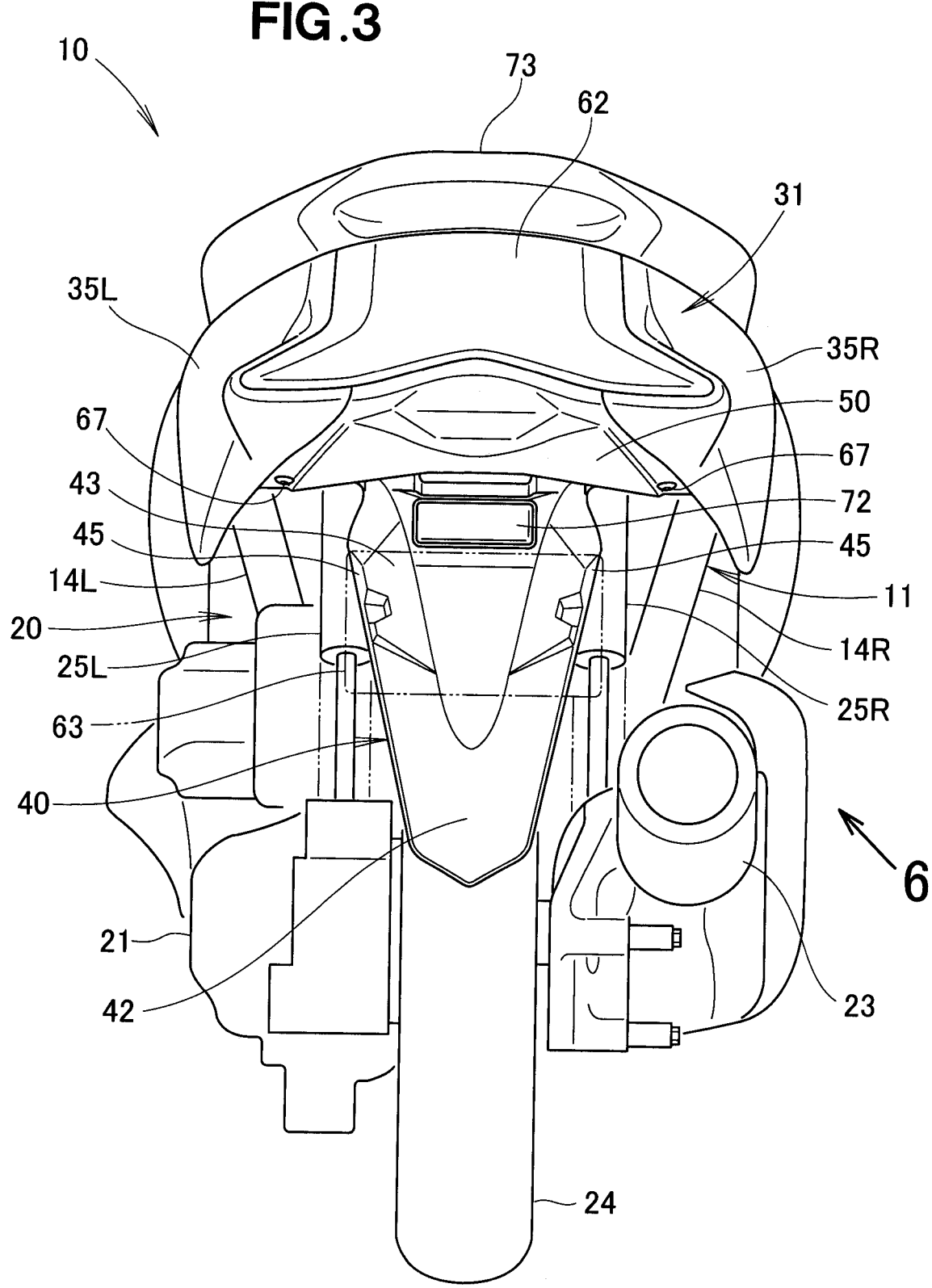
FIG. 3 is a rear elevation view of the motorcycle shown in FIG. 2.

As shown in FIGS. 2 and 3, a taillight unit 62 is disposed behind the seat rails 14L for emitting light rearward. The rear center lower cover 50 covers a lower side of the taillight unit 62. A grab rail 73 extends from rear sides of the seat rails 14L and above the taillight unit 62. A plate member 63 indicating information identifying the motorcycle (hereinafter referred to as "vehicle 20") is disposed on the fear fender 40.

The rear fender 40 includes a horizontal portion 41 extending generally horizontally, and a rear hung portion 42 extending from a lower part of the horizontal portion 41 in a downward and rearward direction. The plate member 63 is attached to a rear surface 43 of the rear hung portion 42 by a fastener 64.

The horizontal portion 44 has a horizontal extension 44 extending in a rearward direction of the vehicle. The horizontal extension 44 is positioned at an upper part of the rear fender 40. The rear fender 40 has a lamp 71 disposed on a rear end of the horizontal extension 44 for illuminating the plate member 63. The rear fender 40 further has a reflector 72 disposed beside the plate member 63 for reflecting light from the rearward direction.

The rear fender 40 includes the rear surface 43 to which the plate member 63 is attached. The rear surface 43 has a planar shape. The rear fender 40 further includes lateral surfaces 45 projecting from opposite lateral ends of the rear surface 43 in a forward direction of the vehicle. It is to be noted that the opposite lateral ends of the rear surface 43 are spaced from each other in a widthwise direction of the vehicle.

Figure 4:
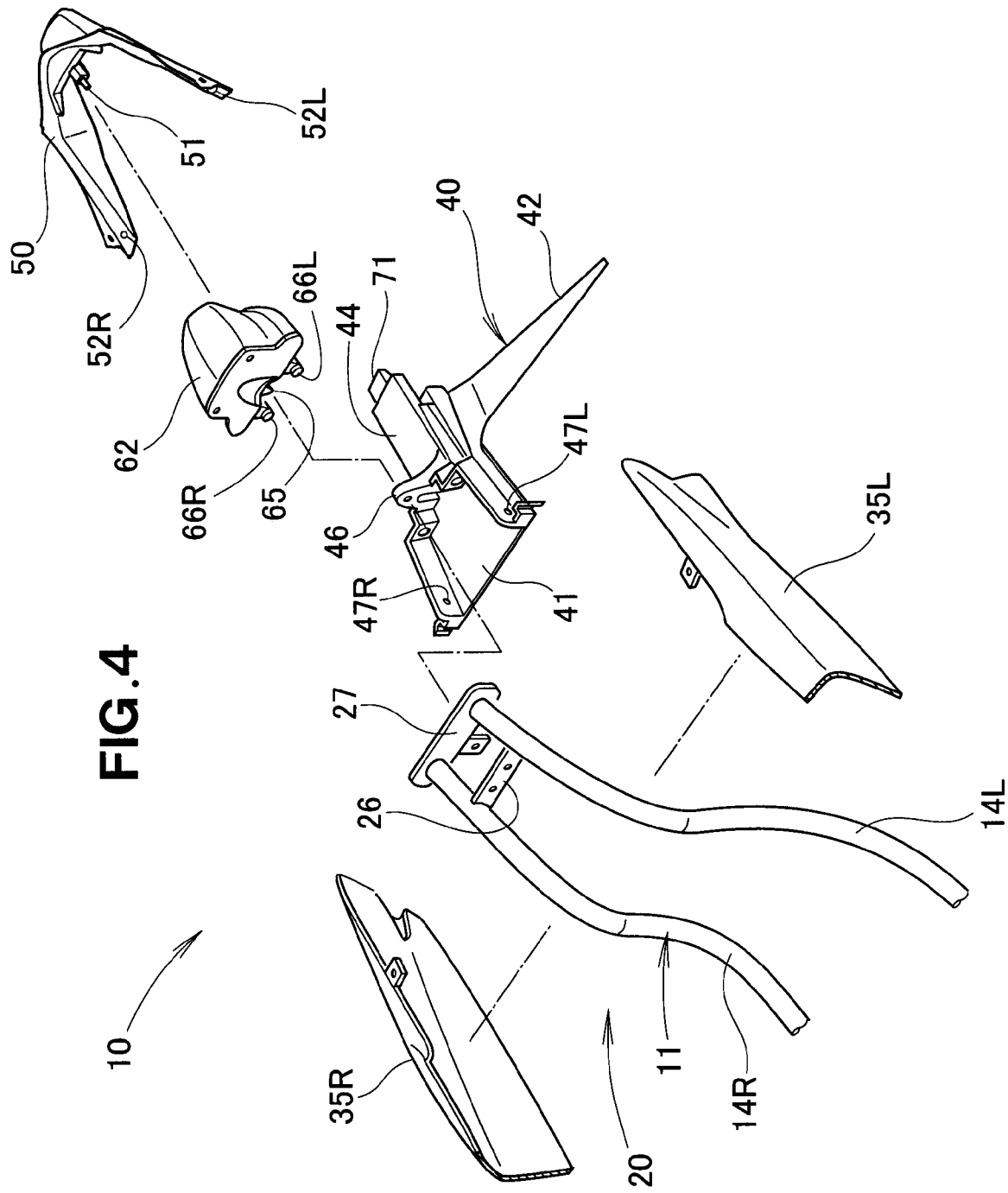
FIG. 4 is an exploded perspective view of the structure of the rear part of the motorcycle shown in FIG. 1.

A rear structure of the vehicle is discussed with reference to FIG. 4, the exploded perspective view of the rear structure. As shown in FIG. 4, the vehicle body frame 11 includes a first cross plate 26 extending between and interconnecting rear parts of the left and right seat rails 14L, 14R, and a second cross plate 27 extending between and interconnecting rear ends of the left and right seat rails 14L, 14R.

The rear fender 40 includes a central mounting portion 46, a left mounting portion 47L, and a right mounting portion 47R. The rear fender 40 is attached to the seat rails 14L, 14R with the central mounting portion 46, the left mounting portion 47L, and the right mounting portion 47R fastened to the second cross plate 27, the left seat rail 14L, and the right seat rail 14R, respectively.

The taillight unit 62 includes a light central mounting portion 65, a light left mounting portion 66L, and a light right mounting portion 66R. The light central mounting portion 65 is attached to the second cross plate 27 together with the central mounting portion 46 of the rear fender 40. The light left mounting portion 66L is attached to the first cross plate 26 together with a left part of the horizontal portion 41. The light right mounting portion 66R is attached to the first cross plate 26 together with a right part of the horizontal portion 41.

The left and right side body covers 35L, 35R, which cover lateral sides of the motorcycle body 20, are attached to the left and right seat rails 14L, 14R, respectively, with the taillight unit 62 held between the body covers 35L, 35R.

The rear center lower cover 50 includes a cover central mounting portion 51, a cover left mounting portion 52L and a cover right mounting portion 52R. The cover central mounting portion 51 is attached to the second cross plate 27 together with the light central mounting portion 65 and the central mounting portion 46. The cover left mounting portion 52L and the cover right mounting portion 52R are attached to the rear fender 40. The portions 52L, 52R cover at least one part of the rear fender 40 from below.

The attachment of the rear center lower cover 50 is done after the rear fender 40 is secured. More specifically, after secured to the rear fender 40, the lamp 71 is covered with the rear center lower cover 50. An operator is simply required to remove the center lower cover 50 for the maintenance operation of the lamp 71. As a result, the well-maintained lamp 71 is provided.

Figure 5:
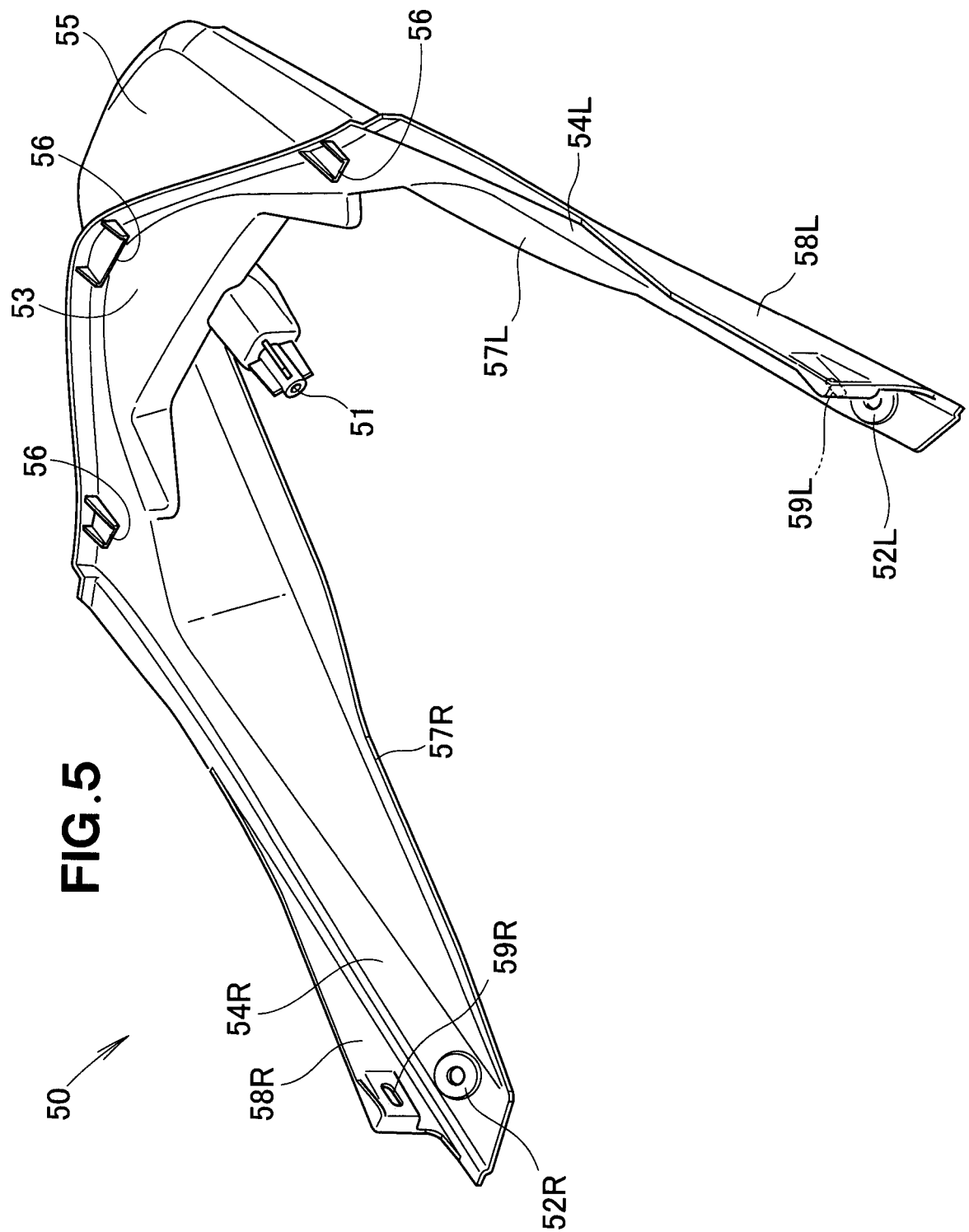
FIG. 5 is a perspective view of the rear center lower cover shown in FIG. 4.

A discussion is made below as to the rear center lower cover. As shown in FIG. 5, the rear center lower cover 50 includes a light cover portion 53 to cover the taillight unit 62 (FIG. 2) from below. The rear center lower cover 50 also includes left and right lower cover portions 54L, 54R extending forward from the light cover portion 53 to cover the motorcycle body 20 (FIG. 2) from below. The rear center lower cover 50 further includes a roof portion 55 extending rearward from the light cover portion 53 to cover the lamp 71 (FIG. 2) from above.

The cover central mounting portion 51 protrudes forward from the light cover portion 53. The cover left mounting portion 52L is formed at a front end part of the left lower cover portion 54L. The cover right mounting portion 52R is formed at a front end part of the right lower cover portion 54R. The light cover portion 53 has a forward protruding lug 56 formed inside an upper part thereof. The engagement of the lug 56 with the taillight unit 62 attaches the rear center lower cover 50 and the taillight unit 62 together.

The left lower cover portion 52L includes a left bend 57L. The left bend 57L is located at the bottom of the rear center lower cover 50 and protrudes inwardly in the widthwise direction of the vehicle. The right lower cover portion 52R includes a left bend 57R. The right bend 57R is located at the bottom of the rear center lower cover 50 and protrudes inwardly in the widthwise direction of the vehicle.

Also formed at the left lower cover portion 52L is a vertically extending left sidewall 58L. The left sidewall 58L has a left support portion 59L formed at a front end portion thereof. A vertically extending right sidewall 58R is formed at the right lower cover portion 52R, and has a right support portion 59R formed at a front end portion thereof.

Figure 6:
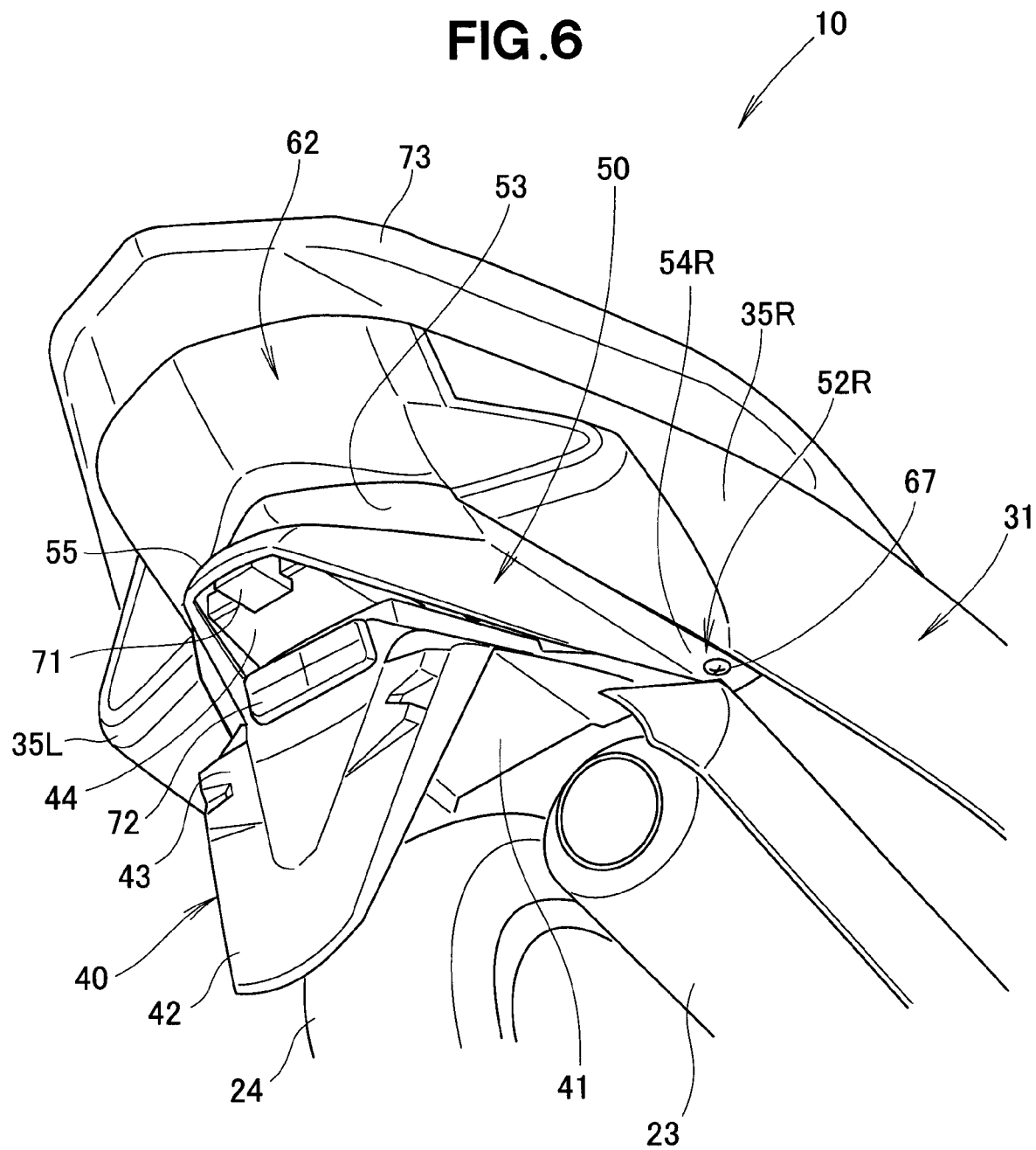
FIG. 6 is a view taken in a direction of an arrow 6 of FIG. 3.
Figure 7:
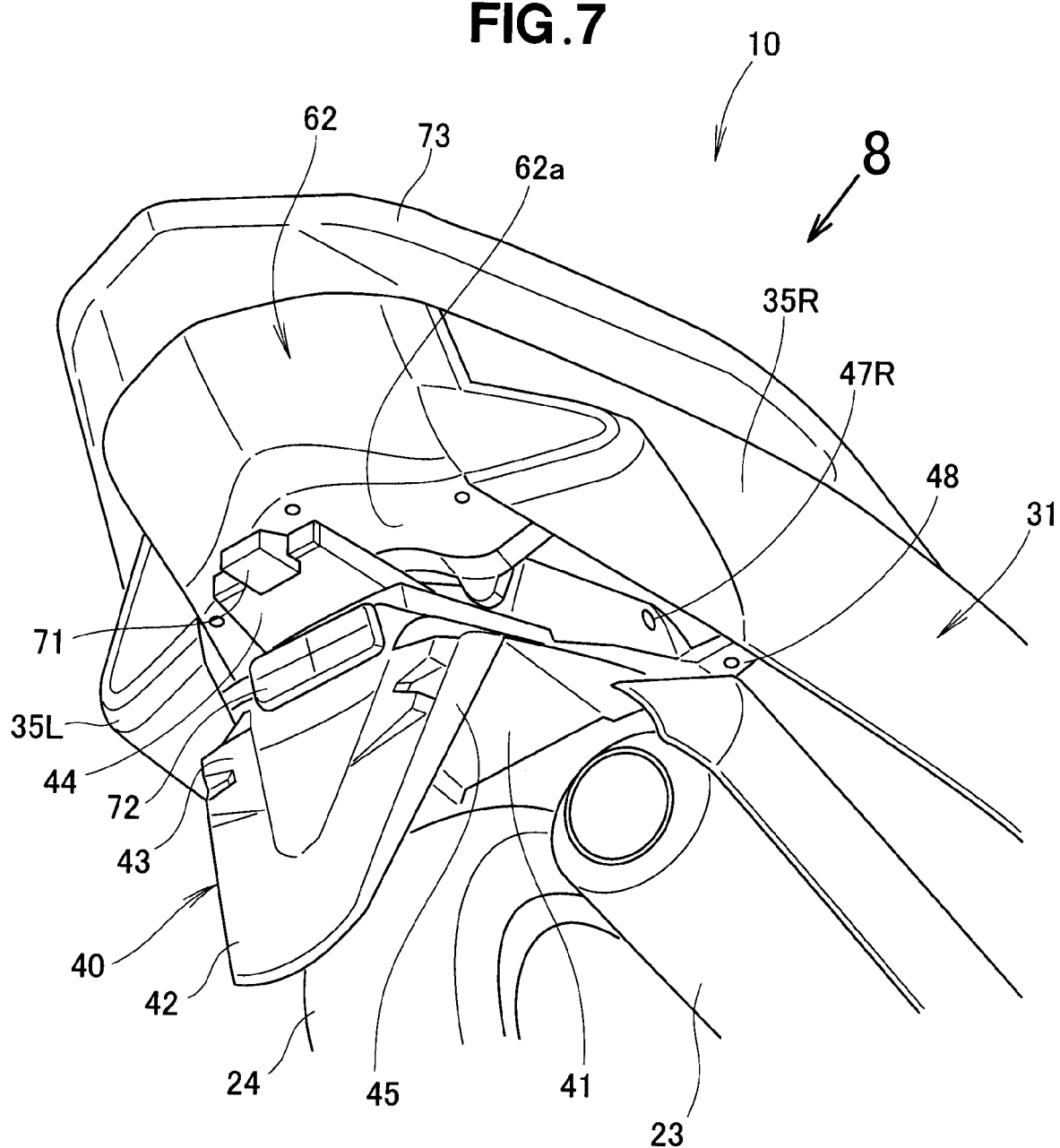
FIG. 7 is a view illustrating the motorcycle shown in FIG. 6 except that the rear center lower cover is removed therefrom.
Figure 8:
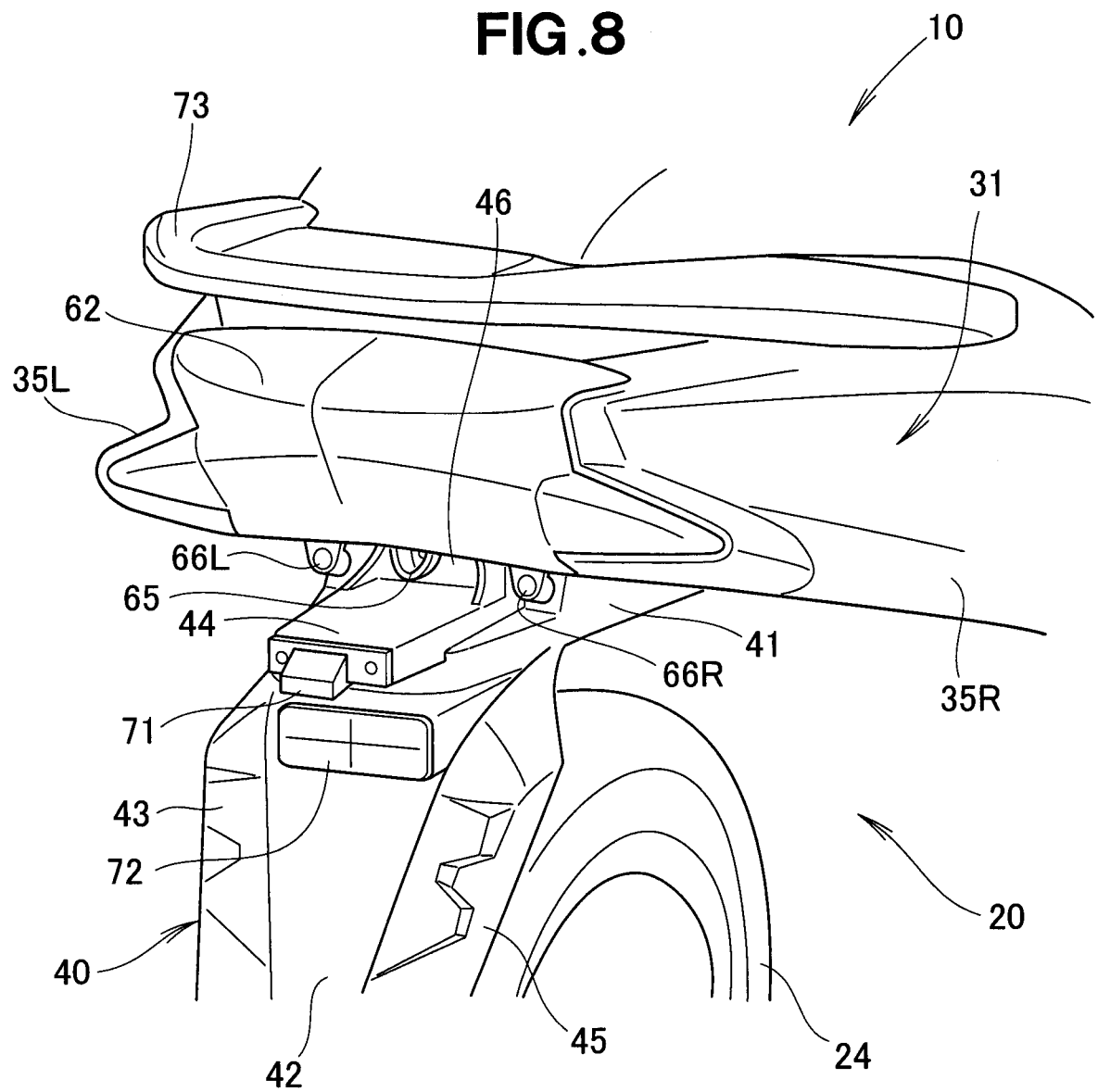
FIG. 8 is a view taken in a direction of an arrow 8 of FIG. 7.

A discussion is made below as to a rear part of the vehicle body. As shown in FIGS. 6 to 8, the horizontal extension 44 of the rear fender 40 protrudes above the rear hung portion 42. The lamp 71, disposed at the rear end of the horizontal extension 44, serves to illuminate the rear surface 43.

The roof portion 55 of the rear center lower cover 50 surrounds lateral, rear and upper sides of the lamp 71 and hence protects the lamp 71. While the roof portion 55 is opened downwardly, the rear hung portion 42 of the rear fender 40 protects a lower side of the lamp 71.

The cover right mounting portion 52R of the rear center lower cover 50 is fastened to a lower mounting hole 48 through a fastener 67. The taillight unit 62 has a lower part 62a covered with the light cover portion 53 of the rear center lower cover 50. The light cover portion 53 is contiguous with the side body cover 35R with no gaps formed therebetween. This prevents intrusion of muddy water into the motorcycle cover 31.

Figure 9:
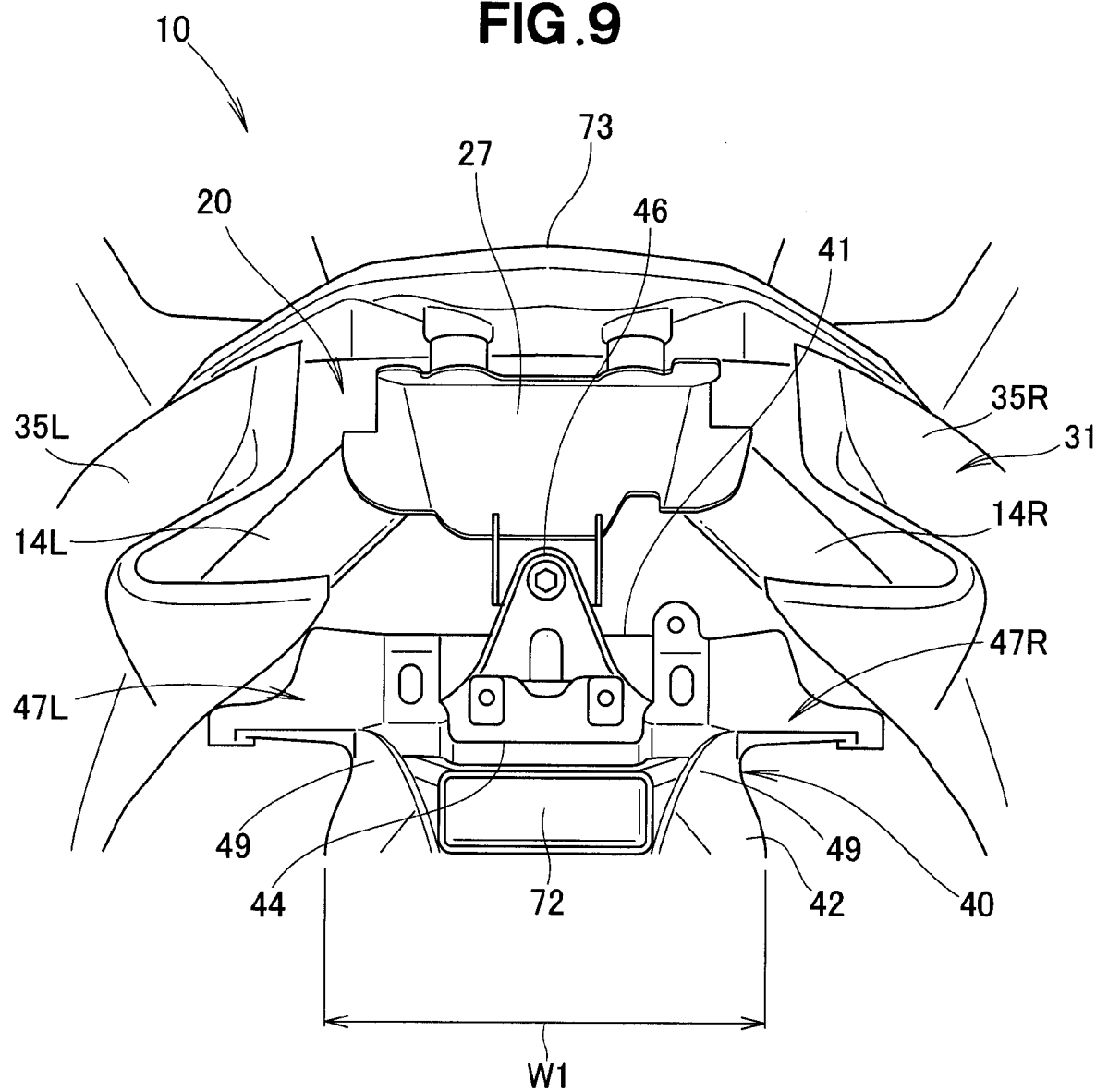
FIG. 9 is a rear elevation view of the motorcycle shown in FIG. 8.
Figure 10:
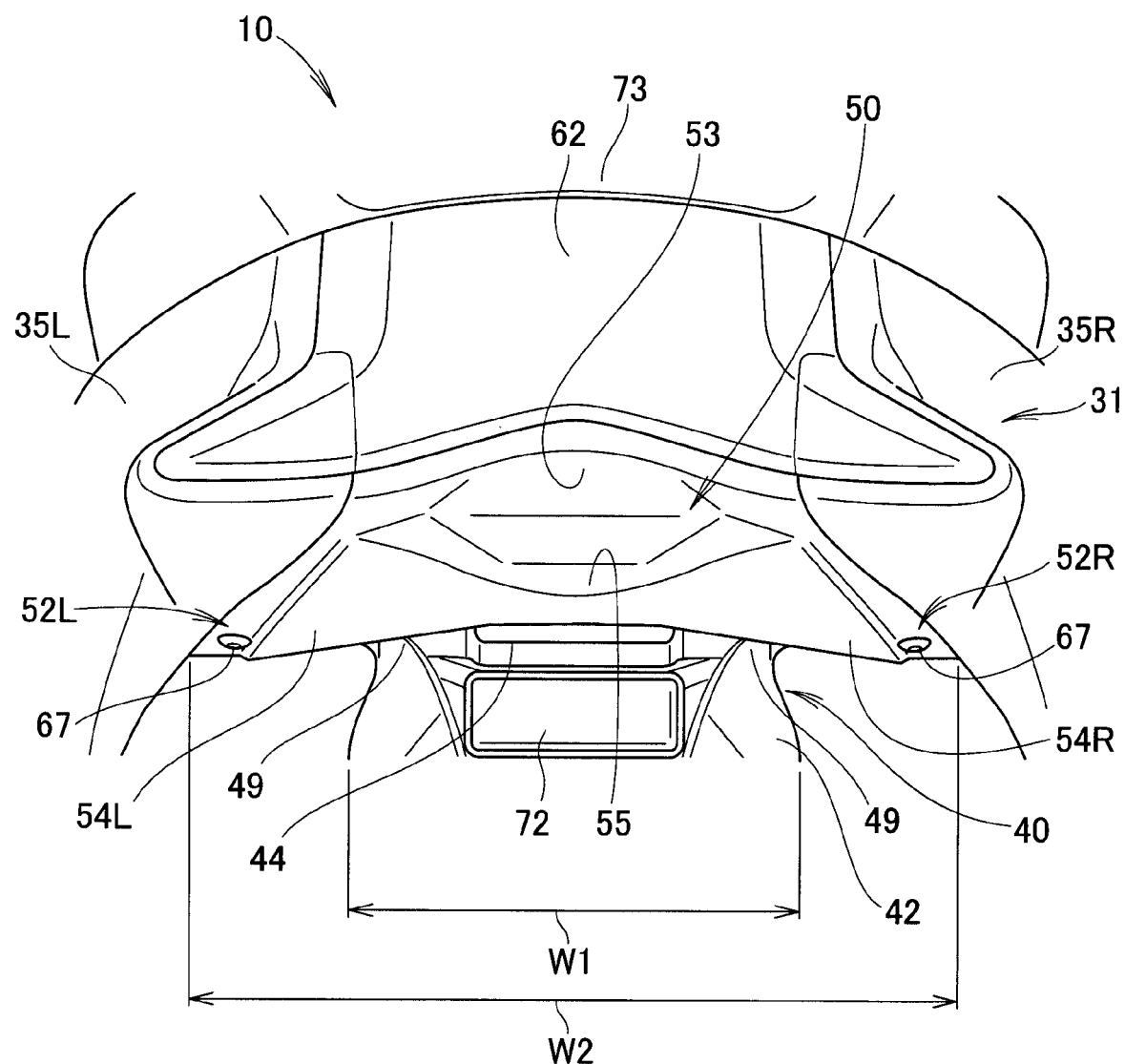
FIG. 10 is a view illustrating the motorcycle shown FIG. 9 except that the rear center lower cover is attached thereto.

A positional relation between the rear fender and the rear center lower cover is discussed below. As shown in FIGS. 9 and 10, the rear center lower cover 50 covers one part of the horizontal portion 42 of the rear fender 40 from below. The center lower cover 50, which covers at least the one part of a lower side of an outside of the rear fender 40, allows the rear fender to have its size without depending upon a width between the left seat rail 14L and the right seat rail 14R.

This achieves the small size of the rear fender 40. In addition, the rear center lower cover 50, which covers at least the one part of the lower side of the outside of the rear fender 40, prevents the splash of muddy water, as with the rear fender 40.

The rear hung portion 42 has a width W1 extending in the widthwise direction of the vehicle. The rear center lower cover 50 has a width W2 extending in the widthwise direction of the vehicle. The width W1 is smaller than the width W2 (W1<W2). In other words, the rear fender 40 and the rear center lower cover 50 overlap when viewed in bottom plan, thereby preventing intrusion of muddy water from below. The width W1 of the rear hung portion 42, which is smaller than the width W2 of the rear center lower cover 50, contributes to the small size of the rear fender 40.

Figure 11:
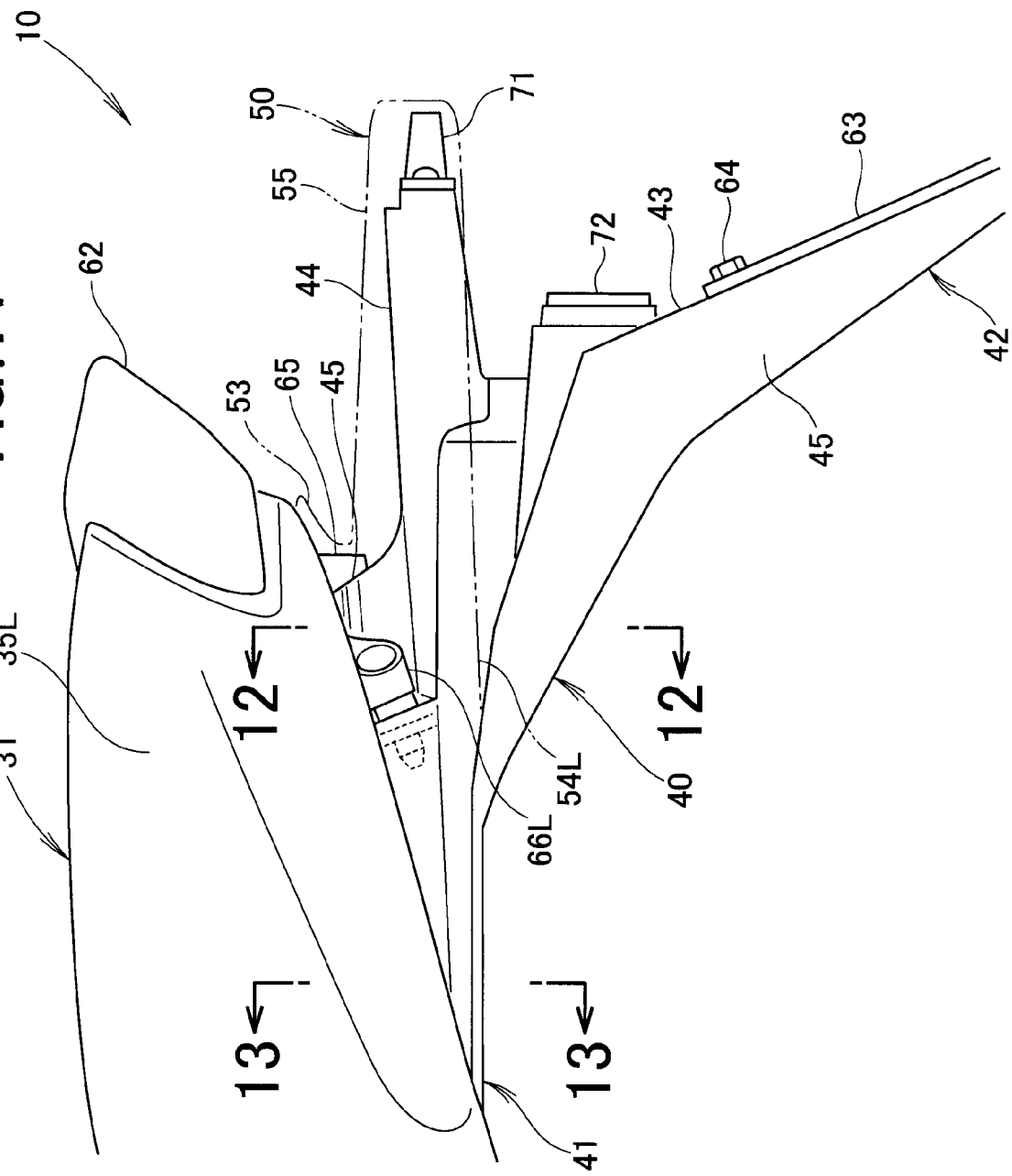
FIG. 11 is a left side elevation view of the rear part of the motorcycle shown in FIG. 10.

As shown in FIG. 11, the lamp 71 disposed at the rear end of the horizontal extension 44 of the rear fender 40 is positioned above the plate member 63. The rear surface 43 of the rear hung portion 42 slants such that the plate member 63 is entirely illuminated by the lamp 71.

While the embodiment discusses the plate member 63 attached directly to the rear fender 40, the plate member 63 may be attached through a stay to the rear fender 40. When the plate member 63 is attached to the rear fender 40 through the stay, an angle of the plate member 63 relative to the lamp 71 may be appropriately changed.

When the vehicle is viewed in side elevation, the rear center lower cover 50 extends along the horizontal portion 41 of the rear fender 40. The roof portion 55 covers an upper side of the rear fender 40. The light cover portion 53 covers the lower side of the taillight unit 62. The left lower cover portion 54L covers a lower side of the side body cover 35L.

FIGS. 12 and 13 are rear elevation views of the motorcycle 10. As shown in FIGS. 12 and 13, the left bend 57L of the rear center lower cover 50 protrudes inwardly from a lower end part of the left lower cover portion 54L in the widthwise direction of the vehicle. The left bend 57L is located above a lateral outer end of the rear hung portion 42, and protrudes inwardly beyond a lateral outer end of the rear hung portion 42 in the widthwise direction of the vehicle. The rear center lower cover 50 has a lateral outer end portion overlying a lateral inner end portion of the left side body cover 35L.

This prevents muddy water from intruding into the rear center lower cover 50 as the muddy water is forced upwardly. As a result, the taillight unit 62 disposed above the rear center lower cover 50 is protected from muddy water.

The horizontal portion 41 of the rear fender 40 has a projection 49 protruding outwardly toward the rear center lower cover 50 in the widthwise direction of the vehicle. The projection 49 is located above a lateral inner end of the left bend 57, and protrudes outwardly beyond the lateral inner end of the left bend 57 in the widthwise direction of the vehicle. The rear hung portion 42, the left bend 57L and the projection 49, which are arranged in order in the upward direction, define a labyrinth structure to ensure that muddy water does not intrude into the rear center lower cover 50 as the muddy water is forced to splash upwardly. As a result, the taillight unit 62 disposed above the rear center lower cover 50 is protected from muddy water.

The rear center lower cover 50, which protrudes toward a lateral center of the rear fender 40 and thus forms the labyrinth structure, covers a lower side of the motorcycle body 20 even though the rear fender 40 has a smaller width extending in the widthwise direction of the vehicle. This arrangement of the rear center lower cover 50 achieves the small size of the rear hung portion 42 of the rear fender 40.

An inner projecting part 36L, which protrudes inwardly, is provided inside the left side body cover 35L. The inner projecting part 36L is supported by the left support portion 59L of the rear center lower cover 50. The left mounting portion 47L of the rear fender 40 is fastened to the left seat rail 14L through a fastener 68.

As shown in FIG. 14, the rear center lower cover 50 is positioned between the rear fender 40 and each of the left and right side body covers 35L, 35R. The rear fender 40, the rear center lower cover 50 and each of the left and right side body covers 35L, 35R are contiguous with one another. The width of the rear fender 40 is smaller than the width between the left and right seat rails 14L, 14R. This achieves the small size of the rear fender 40 and prevents muddy water from intruding between the left and right side body covers 35L, 35R as the muddy water comes from below.

Although the embodiment discusses mainly the left side structure of the vehicle, the discussion of the left side structure is applicable to the right side structure of the vehicle.

INDUSTRIAL APPLICABILITY

The present invention is preferably applicable to a motorcycle having a rear fender covered with left and right side body covers.

REFERENCE SIGNS LIST

10 . . . a motorcycle (vehicle)
14L, 14R . . . seat rails
19 . . . a seat
20 . . . a motorcycle body
24 . . . a rear wheel
35L, 35R . . . side body covers
40 . . . a rear fender
41 . . . a horizontal portion
42 . . . a rear hung portion
43 . . . a rear surface
49 . . . a projection
46 . . . a recess
50 . . . a rear center lower cover
57L, 57R . . . bends
62 . . . a taillight unit
63 . . . a plate member
64 . . . a fastener
71 . . . a lamp

The invention claimed is:

1. A motorcycle comprising:
    seat rails disposed above a rear wheel and supporting a seat;
    a taillight unit disposed on the seat rails for emitting light rearward;
    left and right side body covers disposed on the seat rails and covering lateral sides of a body of the motorcycle, the left and right side body covers covering the taillight unit with the taillight unit held between the left and right side body covers;
    a rear fender disposed on rear parts of the seat rails for preventing splash of muddy water as the muddy water is forced upwardly by the rear wheel; and
    a rear center lower cover covering a lower side of the taillight unit,
    wherein the rear fender has at least one portion provided inside the respective seat rails in a widthwise direction of the motorcycle, the rear center lower cover is interposed between both the rear fender and both the left and right side body covers in a vertical direction of the motorcycle,
    wherein the rear fender comprises a horizontal portion and a rear hung portion, the rear hung portion has a width extending in the widthwise direction, and the rear center lower cover has a width extending in the widthwise direction, the width of the rear hung portion is smaller than the width of the rear center lower cover,
    wherein the rear center lower cover includes left and right bends provided at a bottom of the rear center lower cover, the left and right bends protruding inwardly in the widthwise direction, and wherein the left and right bends protrude inwardly in the widthwise direction beyond opposite ends of the rear hung portion,
    wherein the horizontal portion includes a projection protruding outwardly toward the rear center lower cover in the widthwise direction, and
    wherein the projection, each of the bends, and the rear hung portion define a labyrinth structure.

2. The motorcycle of claim 1, further comprising:
    a plate member disposed on a rear surface of the rear fender and identifying the motorcycle;
    a fastener attaching the plate member to the rear surface of the rear fender; and
    a lamp disposed on an upper part of the rear fender for illuminating the plate member,
    wherein the rear center lower cover covers the lamp from above.

3. The motorcycle of claim 1, wherein the rear center lower cover covers at least one part of the rear fender from below.

* * * * *